(12) United States Patent
Tang

(10) Patent No.: US 7,643,277 B2
(45) Date of Patent: Jan. 5, 2010

(54) ELECTRONIC DEVICE WITH SUPPORT LEGS

(75) Inventor: Zi-Ming Tang, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 0 days.

(21) Appl. No.: 12/200,466

(22) Filed: Aug. 28, 2008

(65) Prior Publication Data
US 2009/0268398 A1  Oct. 29, 2009

(30) Foreign Application Priority Data
Apr. 25, 2008  (CN) .......................... 2008 1 0301310

(51) Int. Cl.
*G06F 1/16* (2006.01)
(52) U.S. Cl. .............................. 361/679.15; 280/11.19; 248/624; 455/575.6; 345/156
(58) Field of Classification Search .............. 280/11.19, 280/32.5; 273/317.5; 248/346.1, 624; 361/679.57, 361/679.14, 679.33, 679.4; 345/156; 206/320; 455/575.6; 174/351
See application file for complete search history.

(56) References Cited

U.S. PATENT DOCUMENTS 7,161,799 B2 * 1/2007 Lim et al. .............. 361/679.55
7,382,606 B2 * 6/2008 Tracy et al. ............ 361/679.55

* cited by examiner

*Primary Examiner*—Hung V Duong
(74) *Attorney, Agent, or Firm*—Clifford O. Chi

(57) ABSTRACT

An exemplary electronic device (30) includes a main body (40) and two support legs (43). The main body has two sloping slide portions (415) formed at two adjacent corners thereof. A depth of each sloping slide portion increases from one end to the other end. Each support leg are movably connected to one corresponding sloping slide portion, such that a height of the support leg relative to main body is capable of being changed when the support leg moves relative to the main body.

14 Claims, 7 Drawing Sheets

ELECTRONIC DEVICE WITH SUPPORT LEGS

BACKGROUND

1. Technical Field

The present invention generally relates to electronic devices, particularly to an electronic device with a main body and a rotatable display body.

2. Description of Related Art

Notebook computers have become popular alternatives to desktop computers because of its portability. A typical notebook computer includes a display body and a main body with a keyboard. The display body is rotatably attached to the main body so that the display body can be opened and closed relative to the main body. In most circumstances, the typical notebook computer is operated on a tabletop. However, the keyboard is usually parallel to the tabletop making it very uncomfortable for a user to operate the notebook. In addition, the main body of the notebook computer is in contact with the desktop. Heat produced by internal electronic components cannot be dispersed efficiently from the main body of the notebook, even though the notebook has a fan for heat dissipation. As a result, the internal electronic components may be damaged from overheating. Accordingly, a notebook computer which can solve the above-described problems is needed.

A notebook computer having a keyboard popped up away from a main body and slanted relative to the main body may feel comfortable for the user to operate the keyboard. In addition, a gap for emitting heat is formed between the keyboard and the main body.

However, dust and harmful substances may easily get inside the main body through the gap and deposit on the internal electronic components. This may cause a short circuit of the internal electronic components, and make it difficult to disperse the heat produced by the internal electronic components.

Therefore, an electronic device which overcomes the above-described shortcomings is desired.

SUMMARY

An electronic device includes a main body and two support legs. The main body includes two sloping slide portions formed at two adjacent corners thereof. A depth of each sloping slide portion increases from one end to the other end. Each support leg are movably connected to one corresponding sloping slide portion such that a height of the support leg relative to main body is capable of being changed when the support leg moves relative to the main body.

Other advantages and novel features will become more apparent from the following detailed description when taken in conjunction with the accompanying drawings.

BRIEF DESCRIPTION OF THE DRAWINGS

The components in the drawings are not necessarily drawn to scale, the emphasis instead being placed upon clearly illustrating the principles of the electronic device. Moreover, in the drawings, like reference numerals designate corresponding parts throughout the several views.

DETAILED DESCRIPTION OF THE EMBODIMENTS

References will now be made to the drawings to describe embodiments of the present electronic device, in detail.

Figure 1:
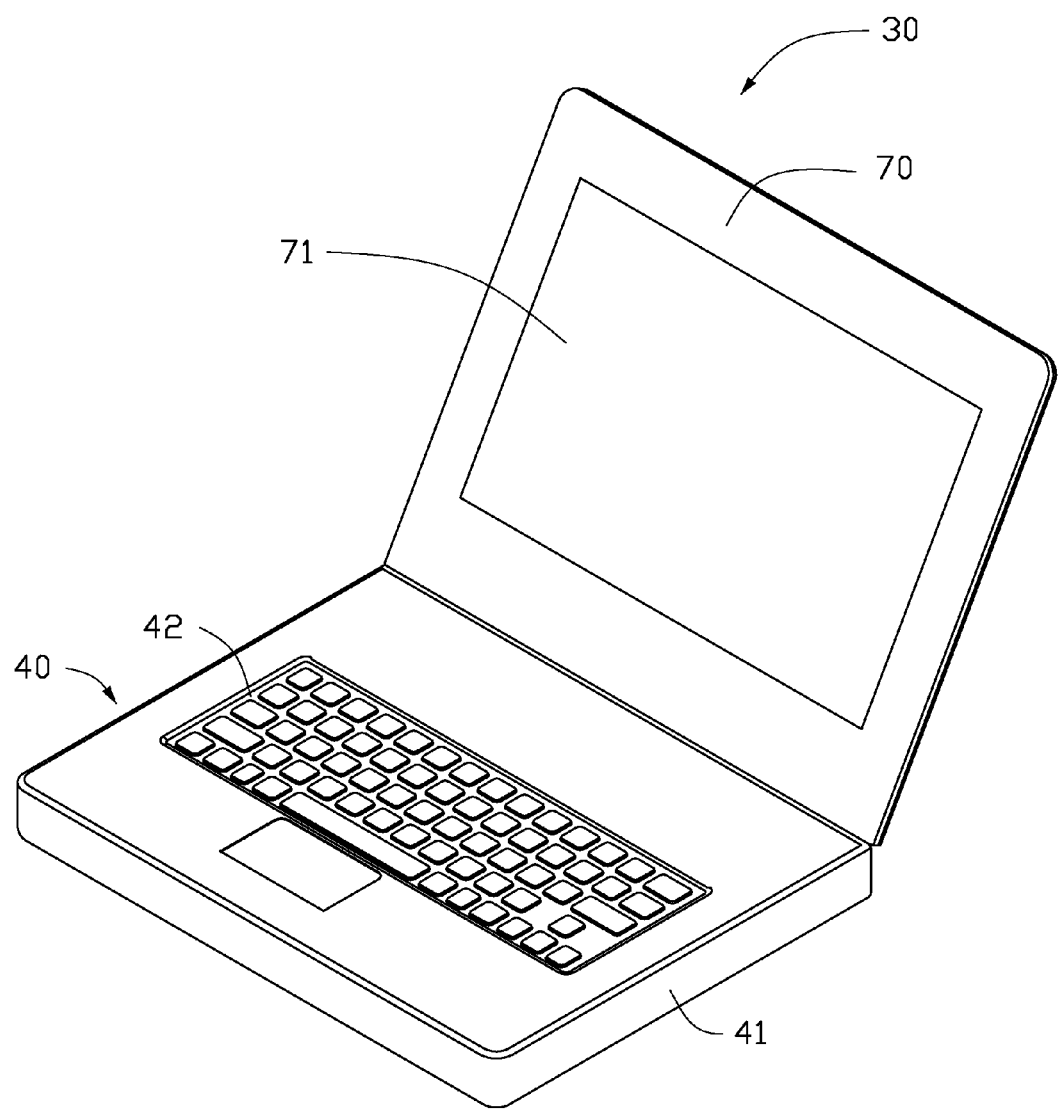
FIG. 1 is an isometric view of a first embodiment of a notebook computer, the notebook computer including a main body, a display body, support legs, and fastening members.
Figure 2:
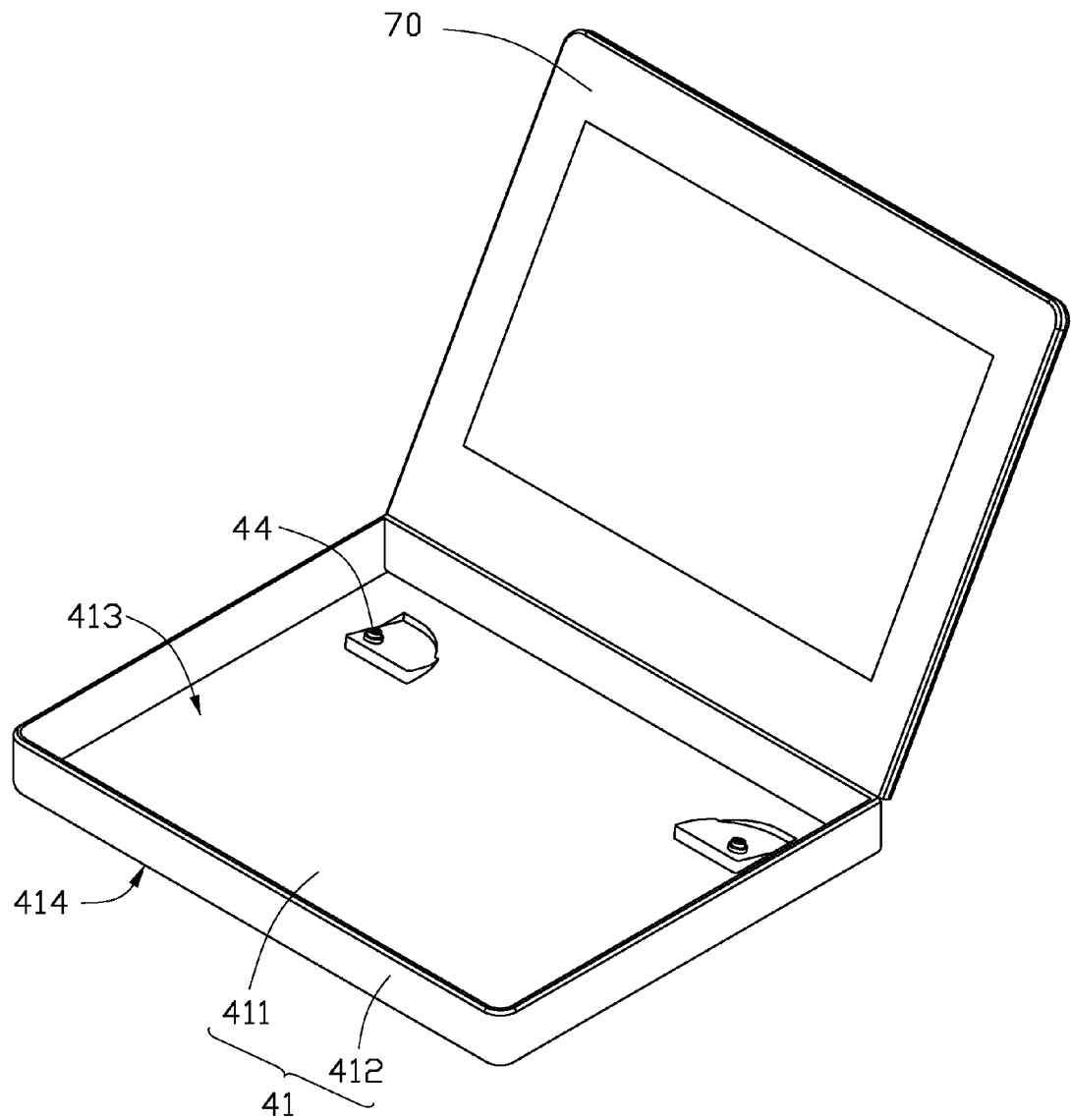
FIG. 2 is an isometric view of the notebook computer of FIG. 1, showing only a bottom housing of the main body and the display body.
Figure 3:
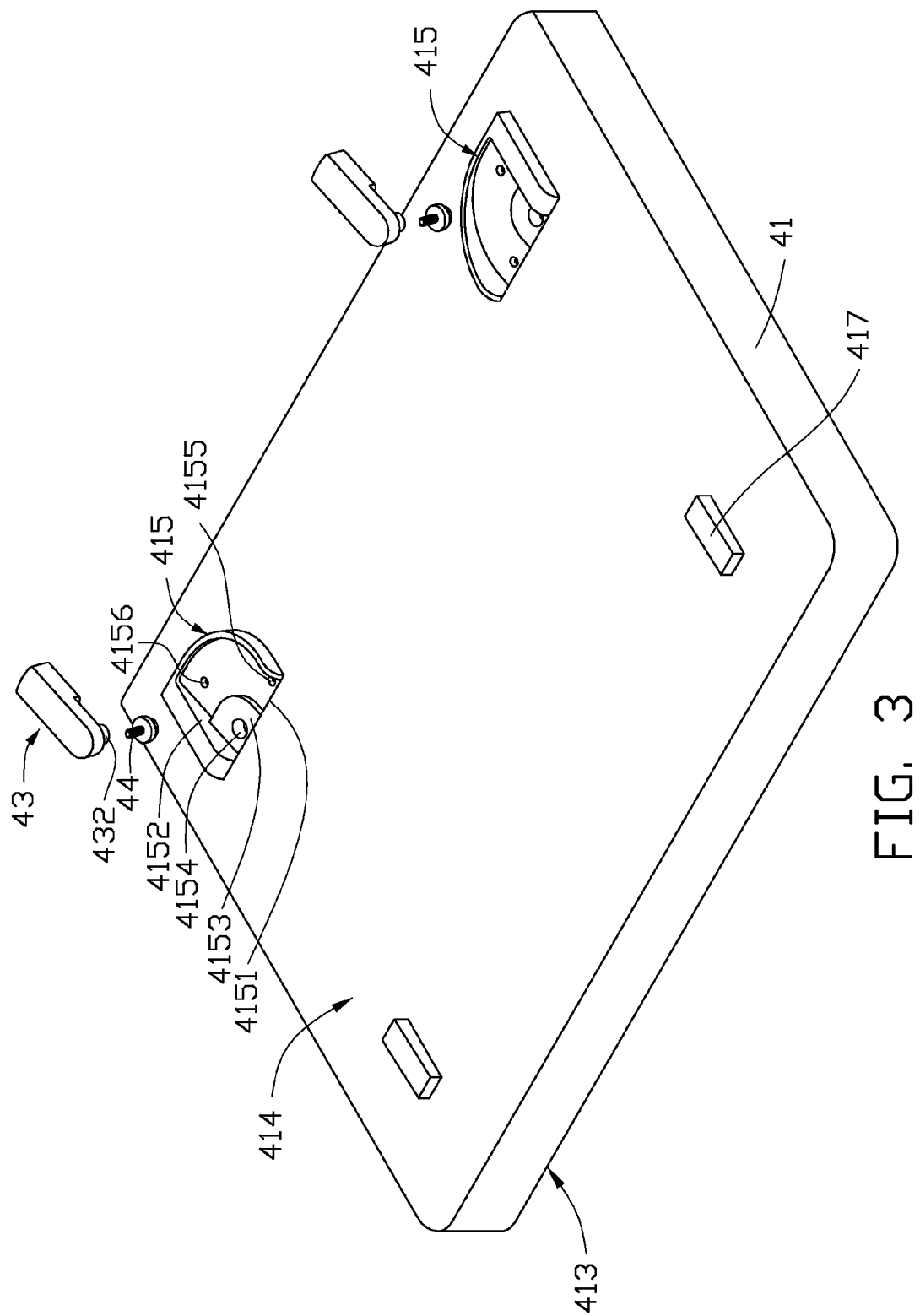
FIG. 3 is an exploded, isometric view of the notebook computer of FIG. 1 but viewed from another aspect, shown without the display body.

Referring to FIGS. 1 through 3, a first embodiment of a notebook computer 30 includes a main body 40, a display body 70 rotatably connected to a connecting side of the main body 40, one or more support legs 43, and one or more fastening members 44 corresponding to the one or more support legs 43. The main body 40 includes a housing 41, a keyboard 42, and a plurality of electronic components (not shown). The keyboard 42 is assembled on a top portion of the housing 41. The electronic components are received in the housing 41 and positioned below the keyboard 42. The display body 70 includes a display panel 71.

The housing 41 includes a rectangular base plate 411 and four side plates 412. extending substantially perpendicularly from edges of the base plate 411. The base plate 411 includes a inside surface 413 facing the display body 70 and a bottom surface 414 opposite to the inside surface 413. One or more sloping slide portions 415 are formed in the second surface 414, preferably adjacent to the connecting side and the display body 70. For example, if the notebook computer 30 includes a single support leg 43, the sloping slide portion 415 is preferably formed in the middle of the bottom surface 414 adjacent to the connecting side and the display body. If the notebook computer 30 includes two support legs 43, the sloping side portion 415 may be formed at two corners of the housing 41. In the illustrated embodiment, the sloping slide portions 415 are quarter circle sloping depressions. Each sloping slide portion 415 includes a first orthogonal end 4151 and a second orthogonal end 4152. A depth of the sloping slide portion 415 increases from the second orthogonal end 4152 to the first orthogonal end 4151. A quarter circle protrusion 4153 is formed adjacent to the intersection of the first orthogonal end 4151 and the second orthogonal end 4152. A center portion of the fan-shaped protrusion 4153 defines a pivot hole 4154. The first orthogonal end 4151 defines a first restricting hole 4155 at a side away from the fan-shaped protrusion 4153. The second orthogonal end 4152 defines a second restricting hole 4156 at a side away from the fan-shaped protrusion 4153. Two pads 417 are formed and aligned parallel to the sloping slide portion 415 adjacent to another side of the base plate 411 opposite to the connecting side.

Figure 4:
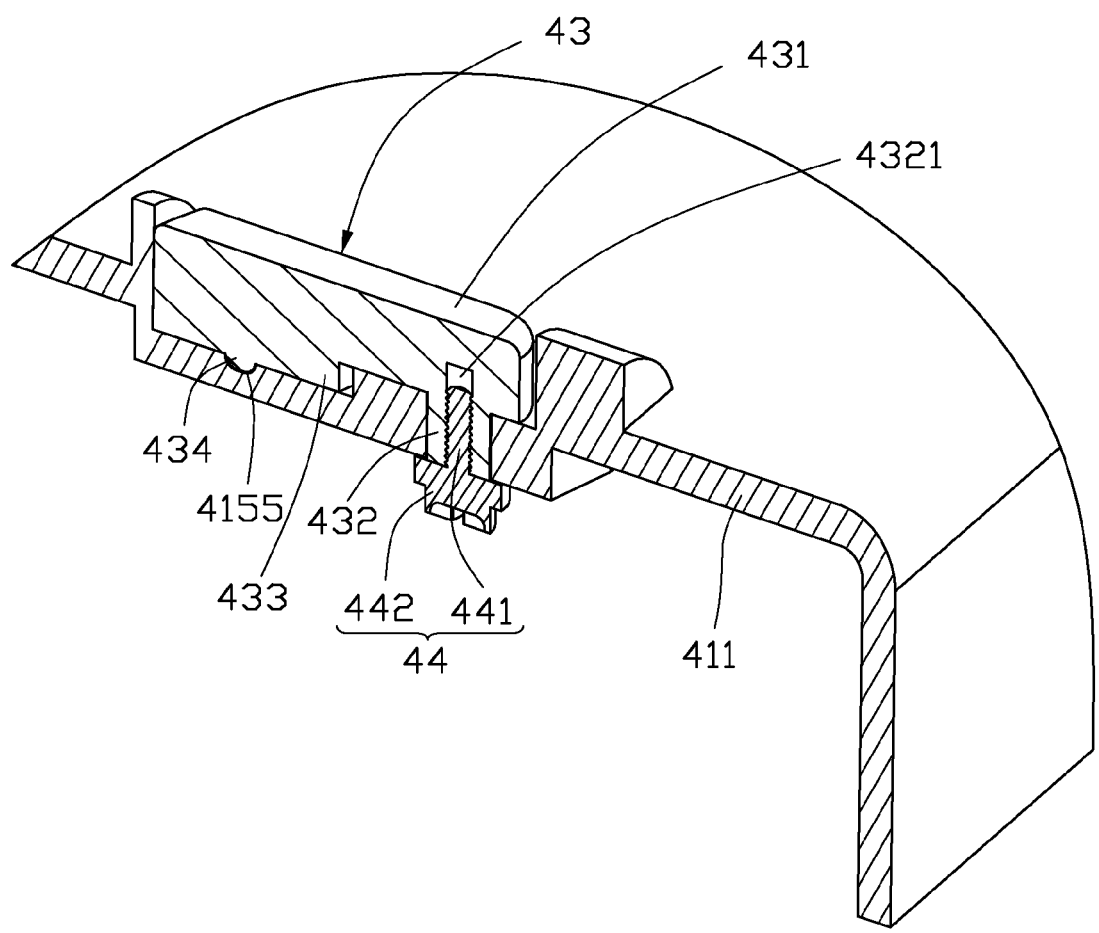
FIG. 4 is a partial cross-sectional view of the notebook computer of FIG. 1, with the support leg in a lowered state.
Figure 5:
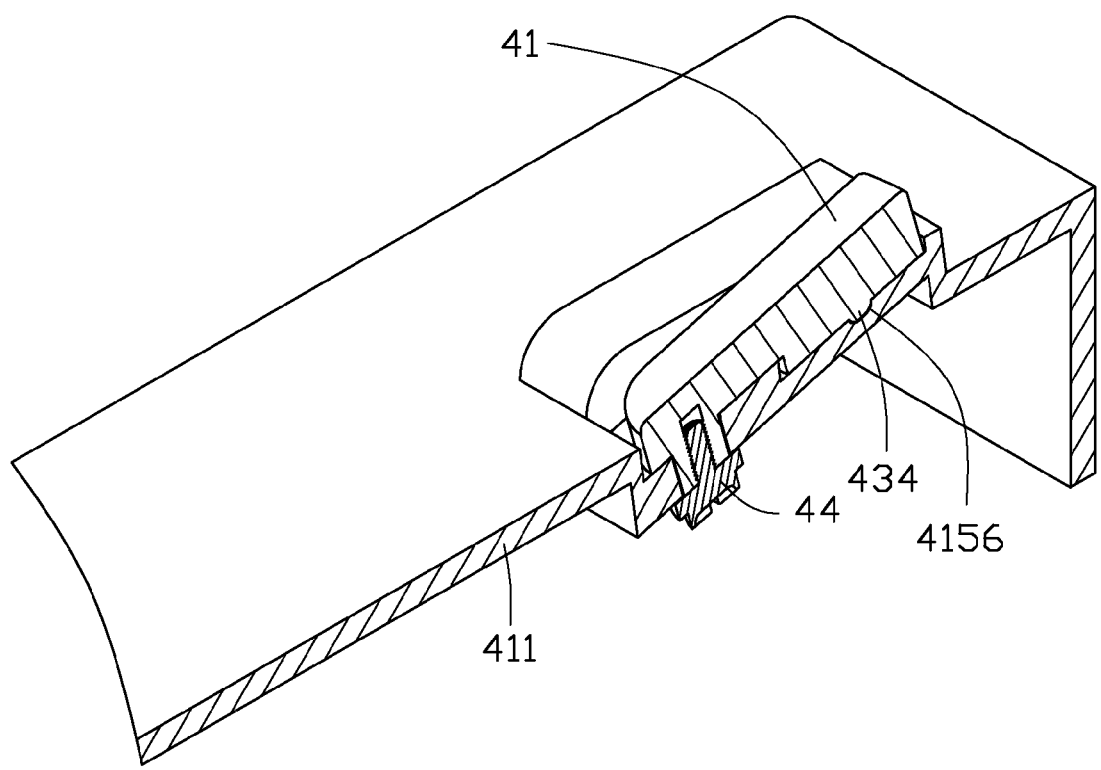
FIG. 5 is a partial cross-sectional view of the notebook computer of FIG. 1, with the support leg in a raised state.

Referring also to FIGS. 4 and 5, each support legs 43 includes a main portion 431. A pivot shaft 432 extends perpendicularly from an end of the main portion 431, and a positioning portion 433 extends from an opposite end of the main portion 431. A center of the pivot shaft 432 defines a fixing hole 4321. A restricting protrusion 434 is formed in the positioning portion 433, and configured for engaging in one of the restricting holes 4155, 4156.

The fastening member 44 includes a threaded shaft 441 and a head 442 extending from an end of the threaded shaft 441. A width of the head 442 is larger than a diameter of the pivot shaft 432.

Figure 6:
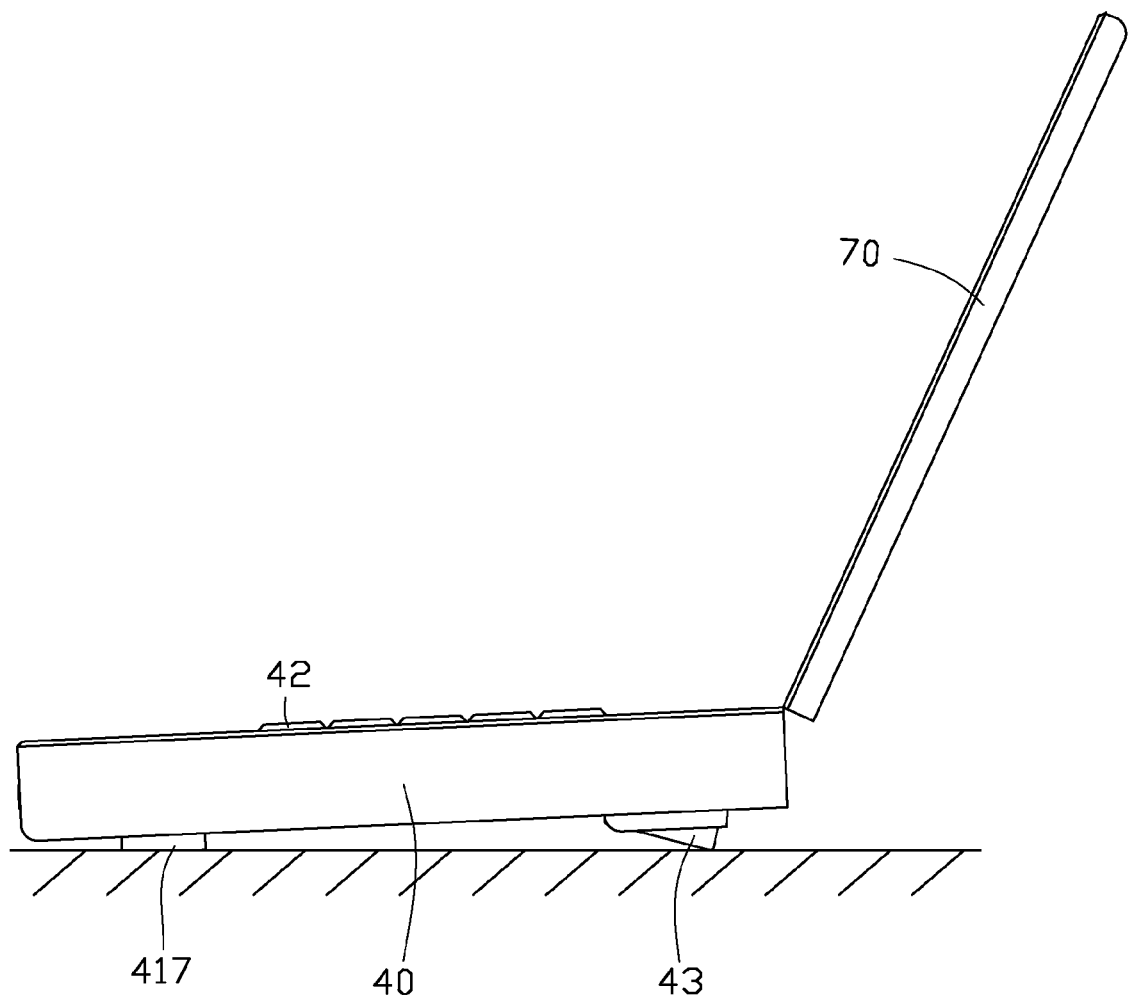
FIG. 6 is a side view of the notebook computer supported by support legs of the notebook computer of FIG. 1.

Referring also to FIG. 6, each pivot shaft 432 is received in each the pivot hole 4154. Each pivot shaft 432 is pivotally attached to the sloping slide portion 415 by screwing the fastening member 44 from the side plate 412 through the pivot hole 4154 and into the pivot shaft 432. If each support leg 43 is positioned in the sloping slide portions 415 such that the restricting protrusion 434 is received in the first restricting hole 4155, the notebook computer 30 is in a lowered state. In other words, the main body 40 is not supported by the support legs 43.

The notebook computer 30 can be changed from the lowered state to a raised state by rotating each support leg 43 about the pivot shaft 432 until the restricting protrusion 434 is received in the second restricting hole 4156. As a result, the main body 40 of the notebook computer 30 is lifted and supported at an inclined angle by the support legs 43.

In the raised state, the notebook computer 30 inclined at an angle such that the lifted side of the notebook computer 30 is above a supporting area such as a tabletop, operating the keyboard 42 would be more comfortable. In addition, heat can be radiated from the bottom surface 414 through a spacious gap defined between the main body 40 and the supporting area. Accordingly, the heat given off or generated by the electronic components can be dispersed more efficiently. The electronic components are kept sealed between the housing 41 and keyboard 42, in order to isolate the electronic components. The support legs 43 are conveniently exposed outside the main body 40 and can be rotated quickly and easily to lower and tilt the notebook computer 30.

It may be appreciated that the sloping slide portion 415 may be a protrusion formed on the bottom surface 414, and a top surface of the protrusion is angled to the second surface 414. Then, each support leg 43 may be attached to the top surface of the protrusion. In addition, the sloping slide portion 415 can be other shapes. The sloping slide portions can also be formed on other electronic devices, such as Personal Digital Assistant (PDA).

Figure 7:
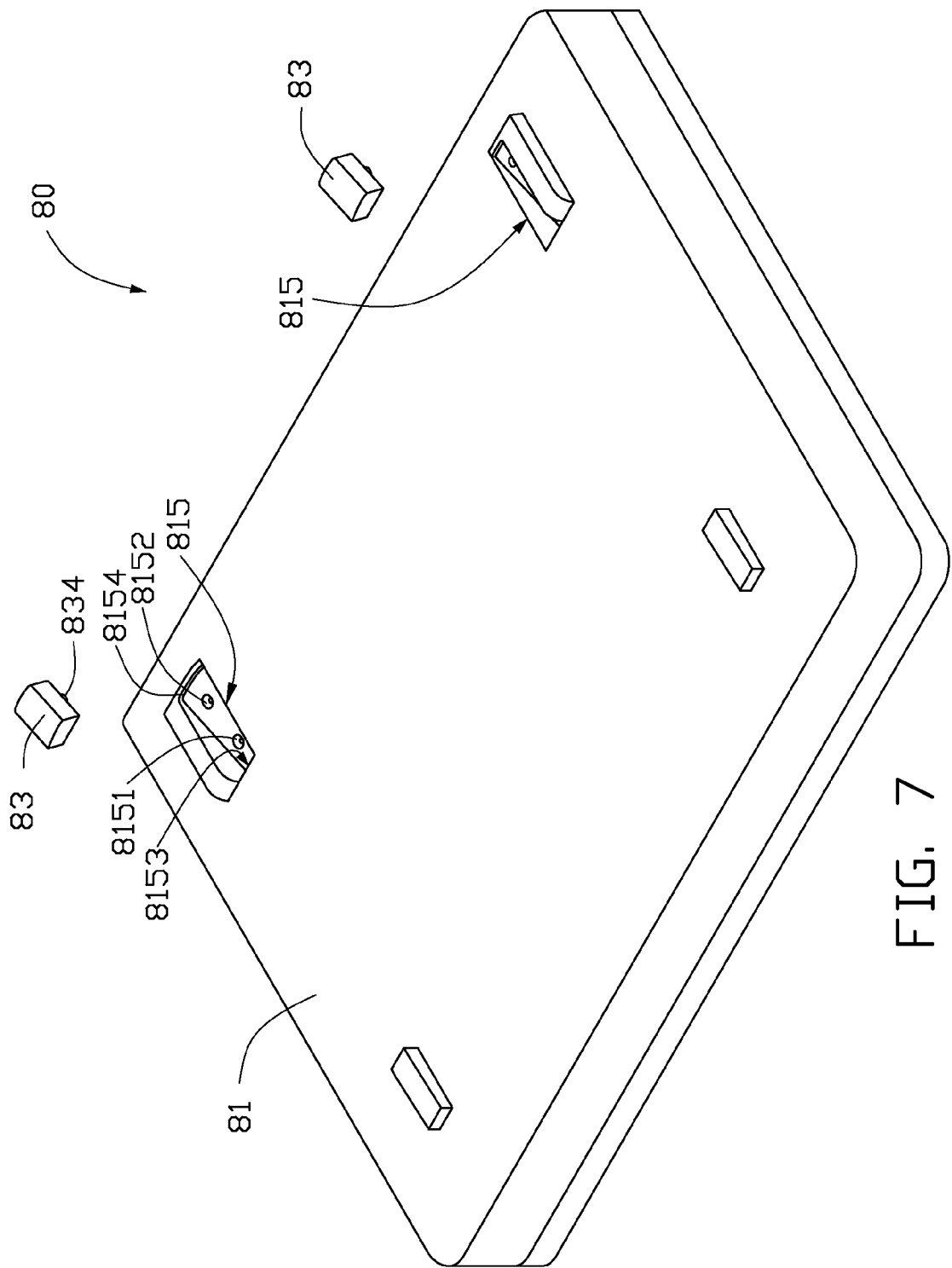
FIG. 7 is an exploded, isometric view of a second embodiment of a notebook computer but viewed from another aspect.

Referring to FIG. 7, a second embodiment of a notebook computer 80 is similar to the first embodiment of the notebook computer 30, except that a sloping slide portion 815 is a strip-shaped depression. The sloping slide portion 815 includes two ends 8153 and 8154. A depth of the sloping slide portion 815 increases from the end 8153 to the end 8154. The end 8153 defines a first restricting hole 8151, and the end 8154 defines a second restricting hole 8152. A restricting protrusion 834 is formed on a support leg 83, configured for engaging with the first restricting hole 8151 or the second restricting hole 8152. When the support leg 83 is located at the end 8154, the notebook computer 80 is supported by the support legs 83.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. An electronic device, comprising:
   a main body having at least one sloping slide portion, wherein a depth of each of the at least one sloping slide portion decreases from a first end to a second end; and
   at least one support leg, wherein each of the at least one support leg is movably connected to each of the at least one sloping slide portion; a height of each of the at least one support leg relative to the main body is capable of being changed when the support leg moves relative to the main body.

2. The electronic device of claim 1, wherein each of the at least one sloping slide portion is quarter circle shaped.

3. The electronic device of claim 2, wherein each of the at least one sloping slide portion is a depression formed in the main body.

4. The electronic device of claim 1, wherein the first end of each of the at least one sloping slide portion defines a first restricting hole; the second end of each of the at least one sloping slide portion defines a second restricting hole; a restricting protrusion configured for engaging in the first restricting hole or the second restricting hole is formed on each of the at least one support leg.

5. The electronic device of claim 1, wherein each of the at least one sloping slide portion is strip-shaped.

6. The electronic device of claim 5, wherein each of the at least one sloping slide portion is a depression formed in the main body.

7. The electronic device of claim 1, wherein each of the at least one support leg comprises a main portion and a shaft extending perpendicularly from an end of the main portion; each of the at least one sloping slide portion defines a pivot hole; each shaft is received in each pivot hole.

8. The electronic device of claim 7, further comprising at least one fastening member, wherein a center of each shaft defines a fixing hole; each of the at least one fastening member engages with each fixing hole so that each of the at least one support leg is rotatably connected to the main body.

9. The electronic device of claim 1, wherein the at least one sloping slide portion comprises two sloping slide portions; the two sloping slide portions are formed in two adjacent corners of the main body; the at least one support leg comprises two support legs; each of the two support legs is rotatably received in each of the two sloping slide portions.

10. The electronic device of claim 1 being a notebook computer.

11. The electronic device of claim 1, further comprising a display body rotatably connected to the main body.

12. The electronic device of claim 1, wherein the main body further comprises a housing, the housing comprises a base plate and a plurality of side plates extending perpendicularly from edges of the base plate; the at least one sloping slide portion is formed in the base plate.

13. The electronic device of claim 12, further comprising a keyboard positioned on a top portion of the housing.

14. The electronic device of claim 1, wherein the main body further comprises a plurality of pads formed on the main body.

* * * * *